June 20, 1967

W. E. WHITE 3,326,081

AUTOMATIC FOCUSSING SLIDE PROJECTOR

Filed Feb. 15, 1965

WILLIAM E. WHITE
INVENTOR

BY R. Frank Smith
Morton A. Polster

ATTORNEYS

June 20, 1967 W. E. WHITE 3,326,081
AUTOMATIC FOCUSSING SLIDE PROJECTOR
Filed Feb. 15, 1965 3 Sheets-Sheet 2
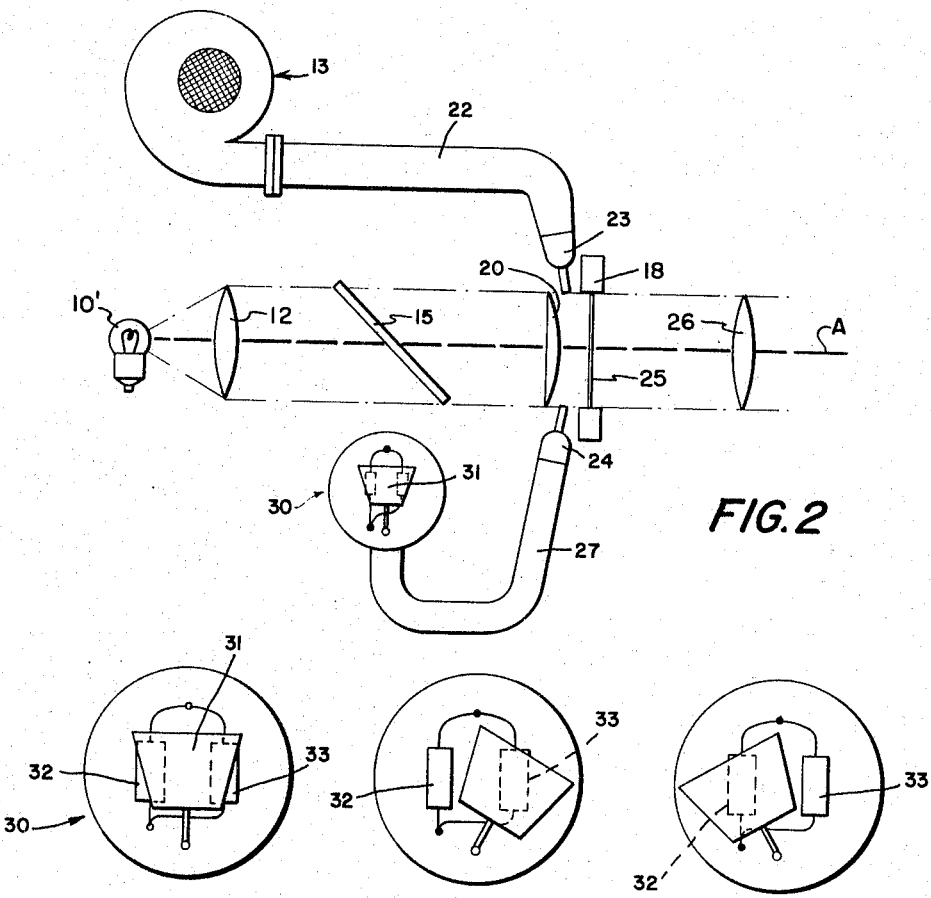
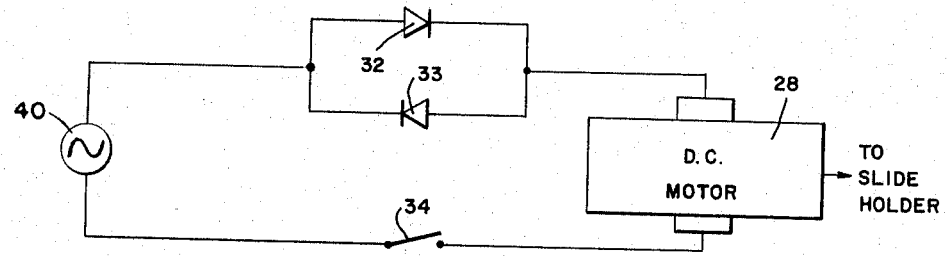
WILLIAM E. WHITE
INVENTOR
BY
ATTORNEYS

United States Patent Office 3,326,081
Patented June 20, 1967

3,326,081
AUTOMATIC FOCUSSING SLIDE PROJECTOR
William E. White, Rochester, N.Y., assignor to Eastman Kodak Company, Rochester, N.Y., a corporation of New Jersey
Filed Feb. 15, 1965, Ser. No. 432,695
10 Claims. (Cl. 88—24)

This invention relates to photographic projection apparatus, and more particularly to a method and means for automatically maintaining image focus in a slide projector.

The subject invention is directed to maintaining correct focus when focus change occurs due to heat distortion or "popping" of film during projection. This often occurs when 35 mm. slides are projected. The invention is also used to maintain correct focus when a slide is fed into the projector in a slightly different position in relation to the lens than was the preceding slide, resulting, of course, in the projector being "out of focus." Although the invention is described in connection with a slide projector, it is also applicable to other types of projection apparatus such as motion picture projectors, photoenlargers, etc.

It is known that changes in film position during projection may be detected by reflecting a light beam from the film surface at near grazing incidence. Shift of the film causes a deflection of the reflected light beam which is sensed by light-sensitive cells. The signal from the cells actuates mechanism to shift the inner focal plane of the projection lens to compensate for the shift in the film plane or to readjust the film plane itself. It may be noted that in practicing the invention herein it has been found that a much more satisfactory compensation is achieved by repositioning the film plane.

Apparatus for automatically focussing a projector must include two basic elements: first, control means for detecting and measuring the change in position of the slide, and, second, adjusting means responsive to the control means for adjusting the focus-setting means of the projector to compensate for any such change in slide position. The present invention relates to the control means and can be used with various adjusting systems, preferably one which moves the slide rather than the lens.

It is an object of the invention to provide apparatus to automatically correct for focus changes during film projection caused by heat distortion or by the slide being placed in the projector in a different position relative to the lens than the previous slide, wherein a highly efficent and quick-acting adjustment of the position of the slide or projection lens is accomplished in an economical manner.

Another object of the invention is to provide a novel method for maintaining proper image focus in projection apparatus.

The novel invention disclosed herein departs radically from the prior art referred to above and solves the problem of automatic focussing in an unobvious manner. According to the invention herein, the control means includes, in effect, a channel formed between the slide and a reference surface. A stream of air or other fluid is directed through the channel and the resultant fluid pressure measured. A shift in the slide relative to the reference surface will result in a change in stream pressure. A highly-sensitive pressure sensing means detects this change in pressure either upstream or downstream of the reference surface, and, depending on whether the change is a rise or a drop in pressure and whether the measurement is being made upstream or downstream, provides an appropriate output to actuate an adjusting means to move the slide toward or away from the reference surface.

The preferred embodiment of the invention herein employs a pair of photocells which are shielded from light by a movable opaque covering, hereinafter called a vane. Upon a shift in the pressure, the vane moves and varies the exposure of the photocells, whereby a current flows, activating the adjustment means to bring the projected image back to its "in focus" condition. Such adjusting means used with our novel control means may be either a mechanical system, as described herein, or a thermal system, as described in a copending application Ser. No. 203,186, filed June 18, 1962, by Ewald et al., now Patent No. 3,205,766 and assigned to the present assignee.

The above and other objects and features of the invention herein will be apparent from the following specification, taken in conjunction with the attached drawings, in which:

FIG. 2 is a schematic diagram of the essential elements of the control means.

FIG. 3 is a view of the air pressure gauge showing the two photorectifiers in broken lines beneath the vane.

FIG. 4 is a view similar to FIG. 3 but with the vane in a second position.

FIG. 5 is a view similar to FIGS. 3 and 4 with the vane in a third position.

FIG. 6 is a diagram of the control circuit used to actuate the adjusting means.

Figure 1:
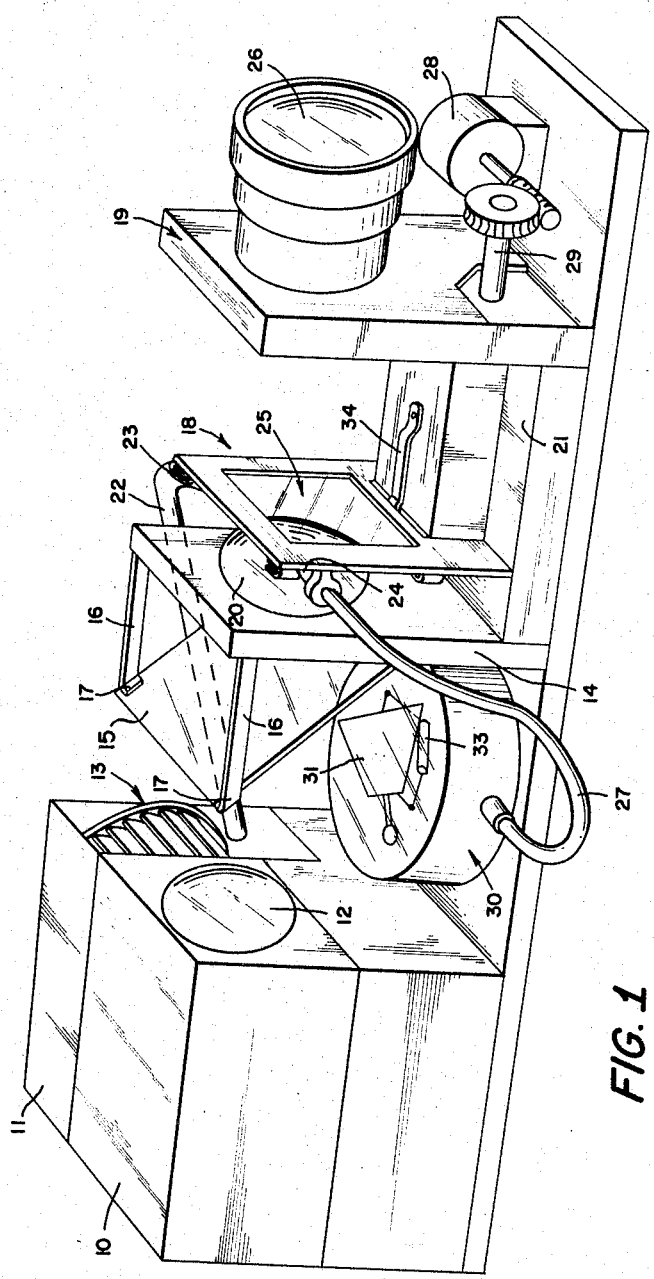
FIG. 1 is a perspective view of the invention herein mounted on a slide projector but not showing the electrical connections.

Referring now to FIGS. 1 and 2, there is shown at the rear of a projector a housing 10 containing a source 10' of light which is directed along a projection axis A passing through the central portions of a condenser lens 12, an inclined plate 15 which is transparent but partially reflecting, a transparent reference surface 20, slide 25, and objective lens 26. Reference surface 20 is one surface of a lens or any transparent material, preferably having a convex curvature, and is supported along projection axis A by upright stationary support 14. Support 14 has at its upper end parallel arms 16 which extend horizontally toward housing 10 and which terminate in free ends. The free ends of arm 16 are then directed toward each other, thereby forming support surfaces 17 for plate 15. These support surfaces are at an angle to axis A, which angle is inclined toward condenser lens 12 and the light source. Due to this inclination, a portion of the projection light is reflected downwardly toward a pair of photocells 32, 33 associated with an air pressure gauge 30, and cooperating therewith to control the focus of the projector in the manner set forth below.

Slide 25 is supported in front of reference surface 20 by frame work 18, which frame work is movable on the surface 21 toward and away from reference surface 20. The upright member 19, located at the front of the projector, supports the objective lens 26 in the light path.

Adjacent to housing 10 and attached to one side thereof is housing 11 in which is located blower 13. Positioned so as to receive air from the blower is tube 2 which extends forwardly from the blower to a point between support 14 and frame 18 at which point it is directed inwardly toward the space between reference surface 20 and slide 25. Tube 22 terminates in a delivery nozzle 23, and may be made of glass or any other suitable material. Opposite nozzle 23 is a recovery nozzle 24 which is positioned so as to recover the air downstream of the narrowmost point between reference surface 20 and slide 25. Nozzles 23 and 24 are supported on framework 18 so as to move with the slide, and tubular member 27 connects nozzle 24 to air pressure gauge 30.

Air pressure gauge 30 must be sufficiently sensitive to monitor the relatively small changes in pressure which occur. For example, pressures as low as 0.30 inch of water may represent full scale deflection of the gauge. In the preferred embodiment, a conventional air pressure gauge is used but is modified to the extent that an opaque vane 31 (see FIG. 3) is attached to the movable indicator member and the dial is converted to a light receiving area on which are juxtaposed the two solid state photocells 32 and 33 (shown in broken lines in FIG. 3) having rectifier characteristics. Gauge 30 is so calibrated that when the projected image is "in focus," i.e., when the central portion of slide 25 is a predetermined distance from the center of convex reference surface 20, the resulting air pressure positions vane 31 in a central position masking equally both photorectifiers 32 and 33 as in FIG. 3.

As shown in FIG. 6, the photorectifiers are connected in parallel and in opposing polarity between an alternating current source 40 and a polarity-responsive reversible D.C. motor 28, which motor is located at the front of the projector beneath objective lens 26. In the particular embodiment illustrated in FIG. 1, motor 28 rotates threaded member 29 to move slide support 18 forward or backward, but any conventional drive means may be used to move the slide. Also in the circuit is a disabling switch 34. When a slide is placed in the frame 18, it operates to close switch 34 thereby completing the circuit.

In addition to the automatic focussing means generally described above, the projection apparatus also includes conventional focussing means (not shown) for making initial manual focus adjustments wherever the distance between the projector and screen is altered. Generally, this initial focus is accomplished by adjusting lens 26 relative to slide 25, and during this manual focussing operation the "in focus" distance between slide 25 and reference surface 20 remains fixed. After the apparatus has been initially focussed by the conventional, manual focussing means, the novel control apparatus disclosed herein then performs all fine focus adjustment automatically.

The automatic operation of the focussing control means is as follows: a slide 25 is placed in frame 18, thereby forming a channel with reference surface 20 and also closing switch 34. An air stream is delivered from blower 13 by tube 22 and is directed through the channel by delivery nozzle 23. Recovery nozzle 24 picks up a portion of the stream of air and, by means of tube 27, delivers it to gauge 30 where the pressure of the recovered stream acts to move vane 31.

The distance between slide 25 and reference surface 20 when the projected image is "in focus," is predetermined, and, as noted above, gauge 30 is so calibrated that the recovered downstream pressure which corresponds to this predetermined "in focus" distance is such that vane 31 is centrally positioned, as shown in FIG. 3, covering both photorectifiers. Light from light source 10' is projected through condenser lens 12 and partially reflected by plate 15 onto the face of gauge 30. The photorectifiers, however, are equally shielded from the light by vane 31 (as seen in FIG. 3) and a balanced condition occurs in which no resultant D.C. current flows through motor 28.

If slide 25 shifts away from reference surface 20, the recovered air pressure increases and vane 31 moves to the right (as in FIG. 4), increasing the exposure of photorectifier 32 and decreasing that of photorectifier 33 to light reflected by plate 15. This allows a resultant half-wave rectified current of a polarity corresponding to the forward conducting direction of photorectifier 32 to flow from A.C. source 40 through D.C. motor 28, thus causing the motor to turn in a first direction and moving slide 25 closer to reference surface 20. As slide 25 is moved toward reference surface 20 along axis A, the pressure of the recovered stream decreases until vane 31 once again moves to its initial "in focus" position equally masking both photorectifiers, and current flow through motor 28 is cut off.

If the above conditions are reversed and slide 25 moves closer to reference surface 20, the recovered air pressure decreases and vane 31 moves to the left increasing the illumination of photorectifier 33 and decreasing that of photorectifier 32, as shown in FIG. 5. Since photorectifier 33 is connected in opposing polarity, a resultant half-wave rectified current of the opposite polarity is delivered from A.C. source 40 to motor 28, causing motor 28 to turn in the opposite direction to move slide holder 18 away from reference surface 20 until balance is once again achieved at the "in focus" position.

Figure 7:
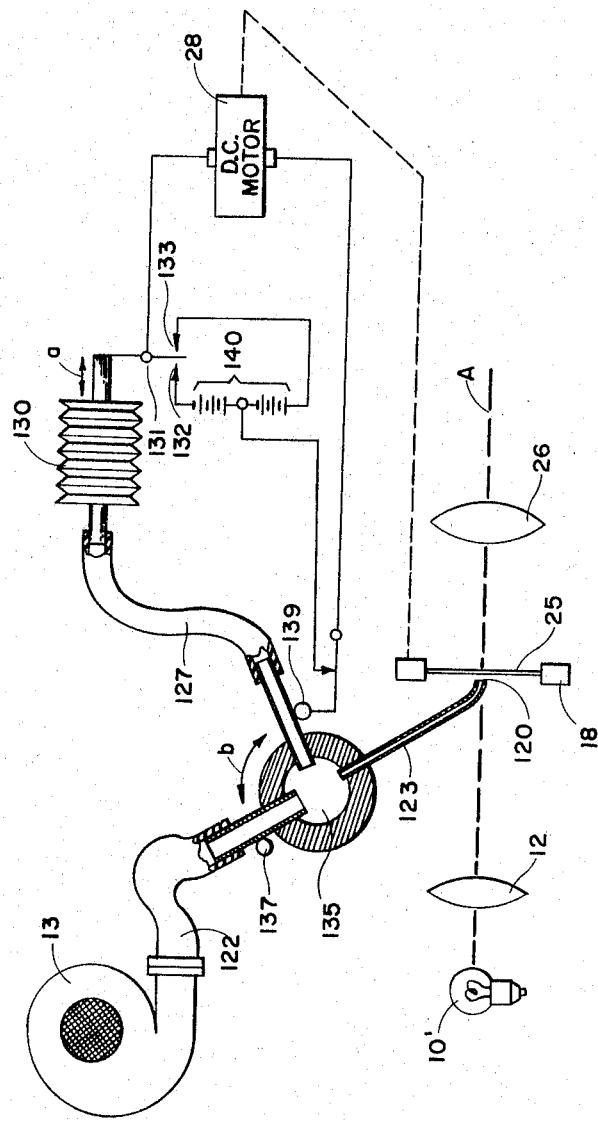
FIG. 7 is a schematic diagram of a second embodiment of the invention.

A second embodiment of the invention herein is illustrated schematically in FIG. 7, and elements having functions similar to elements of the first embodiment have been assigned similar reference numerals. Basically, this second embodiment differs from the embodiment described above in that the air pressure is monitored upstream of the channel between the reference surface and the film rather than downstream.

Nozzle 123 is a thin transparent or translucent tube of a material such as quartz, and the reference lip 120 of nozzle 123 is positioned in close spaced relation to the center of slide 25. A stream of air is directed from blower 13, through tube 122, an air chamber 135 and nozzle 123, and through the channel between reference lip 120 and the surface of slide 25. Also connected to air chamber 135 is tube 127 which terminates in bellows 130. Variations in air pressure in chamber 135, caused by changes in the position of film slide 25 relative to reference lip 120, result in movement of bellows 130 (as indicated by the arrow a) and in similar movement of a motor control switch 131 which is rigidly fixed to the base of bellows 130.

A center-tapped direct current source 140 is connected to polarity-responsive reversible D.C. motor 28 through switch contacts 132 and 133 and circuit disabling switch 134. Bellows 130 is calibrated to maintain switch 131 in its illustrated neutral position when the pressure in chamber 135 is at a predetermined value indicating that slide 25 is "in focus." Motor 28 is drivingly engaged to slide support 18 to move the latter along axis A in a manner described above.

Air chamber 135 is movable about an axis in the direction indicated by the arrow b. When side 25 is removed from slide support 18 by the projector's slide changing apparatus (not shown), air chamber 135 is moved clockwise to displace nozzle 123 during the changing operation. This causes tube 127 to depress switch control 139, thus opening circuit disabling switch 134. When slide 25 is loaded into slide support 18, chamber 135 is moved counterclockwise against stop 137, returning reference lip 120 to the position illustrated and closing switch 134.

Automatic focus adjustment is accomplished by the embodiment shown in FIG. 7 as follows: When slide 25 is "in focus," a predetermined spacing is maintained between it and reference lip 120, and bellows 130 maintains switch 131 in the neutral position illustrated in response to the resulting upstream pressure in chamber 135. In the event that slide 25 moves "out-of-focus" toward reference lip 120, the upstream pressure in chamber 135 increases, bellows 130 enlarges, and motor control switch 131 closes with contact 133. This results in the energization of motor 28 with current of a first polarity and drives slide support 18 to the right. As soon as slide 25 has moved back to its initial "in focus" spacing with reference lip 120, the pressure in chamber 135 drops to its predetermined value, and bellows 130 and switch 131 return to the neutral position illustrated, cutting off current to motor 28.

Similarly, if slide 25 moves "out-of-focus" in the direction away from reference lip 120, a resultant drop in upstream pressure in chamber 135 occurs, and bellows 130 contacts. This causes switch 131 to close with contact 132, energizing motor 28 with current of the opposite polarity, and slide 25 is driven back toward reference lip 120 until upstream pressure in chamber 135 returns to its predetermined "in focus" value, opening switch 131 and cutting off motor 28 once again.

It should be understood that the novel control means described may be used with various adjusting means, as for example, various forms of gears, worms, racks with pinion, cams or thermal adjustment means as found in copending Ewald et al. application Ser. No. 203,186, referred to above. Therefore, the invention herein is not limited to the particular adjustment means disclosed. It should be further understood that, although the invention has been described in detail with particular reference to only two embodiments thereof, variations and modifications can be effected within the spirit and scope of the invention as described hereinabove and as defined in the appended claims.

I claim:

1. In a film image projection apparatus having an objective lens which is movable to establish a given lens to film distance in which an image of the film in its normal plane is projected on a screen or the like in a focused condition, the combination comprising:
   a reference surface positioned in close spaced relation to one surface of the film to be projected;
   means for directing a stream of fluid between said reference surface and said film surface, the pressure of said stream varying as a function of the relative spacing between said surfaces and being of a predetermined value when said film is in its normal plane;
   control means for maintaining (1) said stream pressure at said predetermined value and (2) said given lens to film distance; and
   pressure sensitive means for sensing the pressure of said stream for providing an output varying in accordance with variations in stream pressure resulting from movement of said film from its normal plane due to buckling or any change in position of the film, said film movement changing said given lens to film distance to place the projected film image in an unfocused condition;
   said pressure sensitive means comprising a light source, a pair of photocells responsive to said light source, and a movable vane interposed between said light source and said photocells for providing said output;
   said control means being responsive to the output of said pressure sensitive means when the stream pressure varies from the said predetermined value for restoring and maintaining said predetermined stream pressure and said given lens to film distance.

2. Apparatus according to claim 1 wherein said reference surface is convex and the central portions of said reference surface and said film surface are in axial alignment.

3. Apparatus according to claim 1 wherein said stream directing means includes a nozzle and said reference means is formed by the lip of said nozzle.

4. The invention according to claim 1 wherein said pressure sensitive means includes means to recover a portion of said stream passing between said reference surface and said film.

5. For use in film image projection apparatus having focus adjusting means, an automatic focusing device comprising:
   a reference surface positioned in close spaced relation to one surface of the film to be projected;
   means for directing a stream of fluid between said reference surface and said film surface, the pressure of said stream varying as a function of the relative spacing between said surfaces; and
   pressure sensitive means for sensing the pressure of said stream and for providing an output varying in accordance with variations in stream pressure, said pressure sensitive means including a member movable in accordance with changes in the pressure of said stream, said pressure sensitive means further comprising electrical circuit means responsive to the position of said member for providing said output, said circuit means including a current source and a circuit disabling switch, said switch being closed only when film is inserted in said apparatus.

6. In film image projection apparatus having a light source, a projection axis, and focus adjusting means, automatic focussing means comprising: a reference surface positioned on said axis in close spaced relation to one surface of the film which is to be projected; means to deliver an air stream between said reference surface and said film; recovery means to pick up a portion of said air stream passing between said reference surface and said film; pressure sensitive means connected to said recovery means and having a member movable in accordance with the pressure of said recovered air stream for detecting changes therein caused by shifts in the position of said film, such shifts causing said image to be "out of focus," said pressure sensitive means having a light receiving portion; means for directing light from said light source onto said light receiving portion; electrical circuit means including at least one photorectifier positioned on said light receiving portion; and an opaque vane carried on said movable member and superimposed over said photorectifier, whereby said photorectifier is shielded from and exposed to said light in accordance with the position of said vane thereby controlling current through said circuit means in accordance with changes in the pressure of said recovered air stream; said adjusting means being responsive to said electrical circuit means for restoring said image to its "in focus" condition.

7. The apparatus according to claim 6 wherein said electrical circuit means includes two photorectifiers connected in parallel but in opposing polarity and juxtaposed on said light receiving portion of said pressure sensitive means; and wherein said circuit means further includes an alternating current source; said vane being positioned to shield both said photorectifiers equally from said light when said image is "in focus," in which condition said photorectifiers are equally conductive.

8. The apparatus according to claim 7 wherein said focus adjusting means is capable of moving said film in a first and a second direction along said axis; and wherein an increase in said pressure causes movement of said vane to a second position increasing the illumination of one of said photorectifiers and allowing rectified current of a first polarity to actuate said adjusting means for movement of said film in said first direction; and wherein a decrease in said pressure causes said vane to move to a third position increasing the illumination of the other said photorectifier and allowing rectified current of the opposite polarity to actuate said adjusting means for movement of said film in said second direction.

9. The apparatus according to claim 8 wherein said adjusting means includes a direct current motor in series connection with said circuit means.

10. In film image projection apparatus having
   (A) a light source;
   (B) a projection axis; and
   (C) focus adjustment means; automatic focusing means comprising:
   (D) a curved reference surface positioned on said axis in close spaced relation to film which is to be projected;
   (E) air supply means;
   (F) a delivery tube having one end positioned to receive air from said supply means and having the other end thereof terminating in a first nozzle directed between said reference surface and said film, whereby an air stream is projected between said reference surface and said film;
   (G) a second nozzle positioned in the stream of air emanating from said first nozzle for recovering a portion of said air stream passing between said reference surface and said film;
   (H) pressure sensitive means including
      (i) a light receiving portion and
      (ii) a movable member positionable in accordance with the pressure applied to said pressure sensitive means;
(I) a recovery tube interconnecting said second nozzle and said pressure sensitive means;
(J) means to direct light from said light source onto said light receiving portion;
(K) electrical circuit means including
  (i) an alternating current source
  (ii) a direct current motor, and
  (iii) two photorectifiers positioned on said light receiving portion and connected in parallel but in opposing polarity;
(L) an opaque vane attached to said movable member and positioned between said photorectifiers and said light directing means,
  (i) said vane being moved to a first position equally shielding both photorectifiers from said light to prevent current flow through said motor when said recovered air stream is of a predetermined pressure indicating that said image is "in focus,"
  (ii) said vane being moved to a second position when the pressure of said recovered stream increases above said predetermined pressure, increasing the illumination of a first one of said photorectifiers and allowing rectified current of a first polarity to flow through said motor causing it to rotate in a first direction, and
  (iii) said vane being moved to a third position when the pressure of said recovered stream decreases below said predetermined pressure, increasing the illumination of the second of said photorectifiers and allowing rectified current of opposing polarity to flow through said motor, causing it to rotate in the opposite direction;
(M) said focus adjusting means being responsive to said motor to move said film axially relative to said reference surface
  (i) in one direction when said motor is rotated in said first direction, and
  (ii) in the opposite direction when said motor is rotated in said opposite direction,
whereby said film is moved relative to said reference surface until said recovered air stream returns to said predetermined pressure indicating said film has returned to the position wherein said image is "in focus."

References Cited
UNITED STATES PATENTS

| | | | |
|---|---|---|---|
| 3,103,850 | 9/1963 | Khoury et al. | 88—24 |
| 3,124,996 | 3/1964 | Pfaff | 88—24 |
| 3,260,153 | 7/1966 | Abbott et al. | 88—24 |

NORTON ANSHER, *Primary Examiner.*

R. M. SHEER, *Assistant Examiner.*